Patented Oct. 31, 1944

2,361,371

UNITED STATES PATENT OFFICE 2,361,371

METHOD OF FABRICATING CRYSTALLINE POLYMERS

Alden W. Hanson, Midland, Mich., assignor to The Dow Chemical Company, Midland, Mich., a corporation of Michigan No Drawing. Application April 20, 1942, Serial No. 439,729

5 Claims. (Cl. 18—48)

This invention is concerned with a method of producing an improved fabric from filaments of normally crystalline vinylidene chloride polymers.

As herein used, the term "normally crystalline vinylidene chloride polymer" includes the polymer of vinylidene chloride alone and its copolymers and interpolymers which exhibit crystallinity when examined by X-ray diffraction methods or between crossed Nicol prisms, and compositions prepared therefrom by the inclusion of modifying agents, which compositions retain the working characteristics of the crystalline polymers. The invention will be illustrated with reference to a normally crystalline copolymer of vinylidene chloride with a minor proportion of vinyl chloride. Other copolymers which may be used include the polymer of vinylidene chloride alone and the crystalline copolymers of vinylidene chloride with vinyl acetate, styrene, methyl acrylate, methacrylate, 2-chloroallyl chloroacetate, ethyl 2-methallyl ether, and many other copolymerizable compounds.

In United States Patent 2,183,602 there is described and claimed a method of processing the polymer of vinylidene chloride and copolymers thereof which includes fusing the polymeric material, chilling the fused mass to supercool it, and plastically deforming the supercooled material. While in the supercooled state, normally crystalline vinylidene chloride polymers have little strength, and any few crystallites which may be present are indicated by X-ray diffraction patterns to have a random arrangement. If the supercooled mass is allowed to stand long enough, or if it is plastically deformed sufficiently, it recrystallizes or "sets," losing its ready deformability and gaining considerable strength.

If the supercooled polymer, obtained as above described, is subjected to plastic deformation (as by stretching) at or about room temperature prior to recrystallization, an elongation of the strand or sheet by a factor of over 100 per cent (normally, as high as 400 per cent) is obtained, accompanied by orientation of the crystallites along the fibre axis. Such oriented articles are claimed in United States Patent 2,233,442. Crystalline polymers which have their crystals oriented as above described have far greater strength in the direction of that orientation than the same crystalline polymer in an unoriented state.

Fabrics composed of filaments of normally crystalline vinylidene chloride polymers oriented along the fiber axis have many desirable properties because such fabrics, whether produced by weaving or other like operations, have high strength characteristics in the plane of the fabric. The fabric is fairly rough and abrasive, however, and efforts to smooth the surface by rolling the fabric through either hot or cold rolls produce a smoother fabric but tend to form sharp edges on each side of the filaments when they are squeezed out of shape by the rolls or other flattening medium.

I have found that fabrics composed of filaments of normally crystalline vinylidene chloride polymers can be processed to produce a smooth fabric in which the individual filaments do not have sharp edges as a result of the treatment. The method which I have discovered comprises subjecting such fabric to the action of a fluid heat-carrier at a temperature and for a period of time sufficient to heat at least an external layer of each filament to a temperature in a range between the softening point and a temperature about 50 centigrade degrees therebelow, and thereafter rolling or otherwise pressing the heated fabric to effect a thickness reduction thereof. This treatment produces a fabric which is very satisfactory for use as seating material and for other purposes. The unexpected result of carrying out this treatment resides in the fact that, if the rolling or pressing operation effects a thickness reduction of between about 25 and about 40 per cent, the strength of the fabric is markedly increased as will be hereinafter shown. The fluid heat-carrier may be steam, or an organic liquid such as glycerine or diethylene glycol. Treatment time in contact with the heating fluid varies with its temperature, which may be from 100° C. to 150° C., the size of the filaments in the fabric, and the extent of heat penetration desired. In general, treatment time up to about ten seconds may be used to obtain penetration of at least twenty per cent of the filament diameter.

It is noted that the fabric sometimes tends to shrink slightly with certain heating fluids and tension may be applied to maintain the fabric dimensions during the operations, if desired. In commercial practice, this presents no problem since the fabric is drawn from a supply roll, contacted with the heating medium, and fed between rollers so that tension is maintained between the fabric supply and the flattening means. In certain instances, however, this shrinking may be quite advantageous. For example, where it is desired to have the fabric take on some particular shape, it may be heated and placed in a die which performs the flattening operation and permits shrinkage whereby the fabric may be permanently conformed to the shape of the die. When desirable, as it frequently is, the fabric may be loosely woven, and shrunk after heating so that a tight weave is obtained. Also, one can have the warp and woof of the fabric composed of different materials which do not have the same shrinkage coefficient when heated, thus making it possible to shrink the fabric more in one direction than the other.

To illustrate the invention, the following example is presented:

Filaments 0.022 inch in diameter, were extruded from a fused normally crystalline mass comprising 90 per cent vinylidene chloride and 10 per cent vinyl chloride, plasticized with 7 per cent of di-(alpha-phenylethyl) ether. These filaments were stretched to produce orientation along the fibre axis as described in United States Patent 2,233,442 and, after recrystallization, were woven into a sheet fabric. This fabric was maintained under sufficient tension to maintain its dimensions, contacted with steam at about 100° C. for two seconds, and passed between a pair of two-inch steel rollers at room temperature. Glycerine at 140° C. with a contact time of one second was also used satisfactorily. The product which was obtained was found to have a surface which was substantially non-abrasive and in which the corresponding warp and woof elements were locked together at the point of contact so that a definite sparkle was given out by light reflection from internal facets at that point.

Various samples cut from the same piece of fabric and treated in the same manner, except that various reductions in thickness were taken, exhibited the following results as to strength characteristics: Taking the strength of the untreated fabric at 2.3 units, there was a gradual decrease in strength to 1.4 units with reductions up to 15 per cent. Thereafter, the strength of the treated fabric rose steadily, possessing the same strength as the untreated fabric at a thickness reduction of approximately 25 per cent. The strength of the fabric continued to rise with increasing thickness reductions to about a 35 per cent reduction, at which point the strength is approximately 3 units, and then fell of rapidly, returning to substantially the strength of the untreated fabric with a thickness reduction of about 40 per cent.

It is apparent from the foregoing that it is highly advantageous to carry out the treatment of fabric as herein described, taking a thickness reduction between about 25 and about 40 per cent, thereby to accomplish the dual result of eliminating the roughness of the fabric and increasing its strength characteristics.

This application is a continuation-in-part of my prior application Serial 396,182 filed 1941 May 31.

I claim:

1. The method which comprises subjecting fabric composed of filaments of normally crystalline vinylidene chloride polyemsr oriented along the filament axis to the action of a heated fluid for a period of time sufficient to heat said filaments to a temperature in the range between its softening point and a temperature of about fifty centigrade degrees therebelow and thereafter pressing the fabric to effect a thickness reduction of between about 25 and about 40 per cent.

2. The method which comprises subjecting fabric composed of filaments of normally crystalline vinylidene chloride polymers oriented along the filament axis to the action of a heated fluid for a period of time sufficient to heat an external layer of said filaments to a temperature in the range between its softening point and a temperature of about fifty centigrade degrees therebelow and thereafter rolling the fabric to effect a thickness reduction of between about 25 and about 40 per cent.

3. The method which comprises subjecting fabric composed of filaments of a normally crystalline copolymer of vinylidene chloride and vinyl chloride oriented along the filament axis to the action of a heated fluid for a period of time sufficient to heat an external layer of said filaments to a temperature in the range between its softening point and a temperature of about fifty centigrade degrees therebelow and thereafter rolling the fabric to effect a thickness reduction of between about 25 and about 40 per cent.

4. The method which comprises subjecting fabric composed of filaments of normally crystalline vinylidene chloride polymers oriented along the filament axis to the action of a fluid maintained at a temperature between about 100° C. and 150° C. for a period of time sufficient to heat an external layer of said filaments to a temperature in the range between its softening point and a temperature of about fifty centigrade degrees therebelow and thereafter pressing the fabric to effect a thickness reduction of between about 25 and about 40 per cent.

5. The method which comprises subjecting fabric composed of filaments of normally crystalline vinylidene chloride polymers oriented along the filament axis to the action of a fluid heated to a temperature between about 100° C. and about 150° C. for a period of time less than about three seconds to heat an external layer up to 20 per cent of the thickness of the filament to a temperature in the range between its softening point and a temperature of about fifty centigrade degrees therebelow and therafter rolling the fabric to effect a thickness reduction of between about 25 and about 40 per cent.

ALDEN W. HANSON.